United States Patent
Kim et al.

(10) Patent No.: US 9,975,406 B2
(45) Date of Patent: May 22, 2018

(54) SMELL GENERATION TIME PREDICTING DEVICE AND SMELL GENERATION TIME PREDICTING METHOD USING THE SAME

(71) Applicant: Halla Visteon Climate Control Corp., Daejeon (KR)

(72) Inventors: Jae Ho Kim, Daejeon (KR); Kwang Il Kim, Daejeon (KR); Ki Hong Kim, Daejeon (KR); Hwan Myeong Jung, Daejeon (KR); Hong Young Lim, Daejeon (KR); Ji Yong Park, Daejeon (KR); Dong Suk Lee, Daejeon (KR); Yong Jun Jee, Daejeon (KR); Sung Je Lee, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 443 days.

(21) Appl. No.: 14/441,312

(22) PCT Filed: Feb. 5, 2014

(86) PCT No.: PCT/KR2014/000965
§ 371 (c)(1),
(2) Date: May 7, 2015

(87) PCT Pub. No.: WO2014/123346
PCT Pub. Date: Aug. 14, 2014

(65) Prior Publication Data
US 2015/0328961 A1 Nov. 19, 2015

(30) Foreign Application Priority Data

Feb. 6, 2013 (KR) .................. 10-2013-0013347
Feb. 6, 2013 (KR) .................. 10-2013-0013349
Feb. 22, 2013 (KR) .................. 10-2013-0019289

(51) Int. Cl.
*F25B 49/00* (2006.01)
*B60H 3/00* (2006.01)
*B60H 1/32* (2006.01)

(52) U.S. Cl.
CPC ......... *B60H 3/0007* (2013.01); *B60H 1/3202* (2013.01); *B60H 3/0078* (2013.01); *B60H 3/0085* (2013.01)

(58) Field of Classification Search
CPC .. B60H 1/3202; B60H 3/0007; B60H 3/0078; B60H 3/0085
See application file for complete search history.

(56) References Cited

U.S. PATENT DOCUMENTS 5,450,894 A * 9/1995 Inoue ................. B60H 1/00285
165/43
5,649,429 A 7/1997 Schreiber
(Continued)

FOREIGN PATENT DOCUMENTS

JP 05-201235 A 8/1993
JP 2006137271 A 6/2006
(Continued)

*Primary Examiner* — Ljiljana Ciric
(74) *Attorney, Agent, or Firm* — Shumaker, Loop & Kendrick, LLP; James D. Miller

(57) ABSTRACT

A smell generation time predicting device is used for a vehicle air conditioner which includes an evaporator installed in an internal path of an air conditioner case and configured to, when the air conditioner is turned on, cool air blown into a vehicle room. The device includes a first temperature detector, a second temperature detector, and a control unit. The first temperature detector and the second temperature detector are installed at a downstream side of the evaporator in a mutually spaced-apart relationship. The control unit is configured to, when the air conditioner is turned off, predict a smell generation time in the evaporator depending on a temperature difference between the air (Continued)

temperatures detected by the first temperature detector and the second temperature detector.

20 Claims, 7 Drawing Sheets

(56) References Cited

U.S. PATENT DOCUMENTS

| | | | | |
|---|---|---|---|---|
| 6,029,466 | A * | 2/2000 | Wieszt | B60H 1/3207 62/176.6 |
| 2011/0067422 | A1* | 3/2011 | Ichishi | B60H 3/0085 62/176.1 |
| 2012/0152515 | A1* | 6/2012 | Okabe | B60H 1/00785 165/287 |
| 2016/0137035 | A1* | 5/2016 | Yoon | B60H 3/0092 62/78 |
| 2018/0065126 | A1* | 3/2018 | Abate | B03C 3/68 |

FOREIGN PATENT DOCUMENTS

| | | |
|---|---|---|
| KR | 1020050023480 A | 3/2005 |
| KR | 1020070068503 A | 7/2007 |

\* cited by examiner

[Fig. 1]
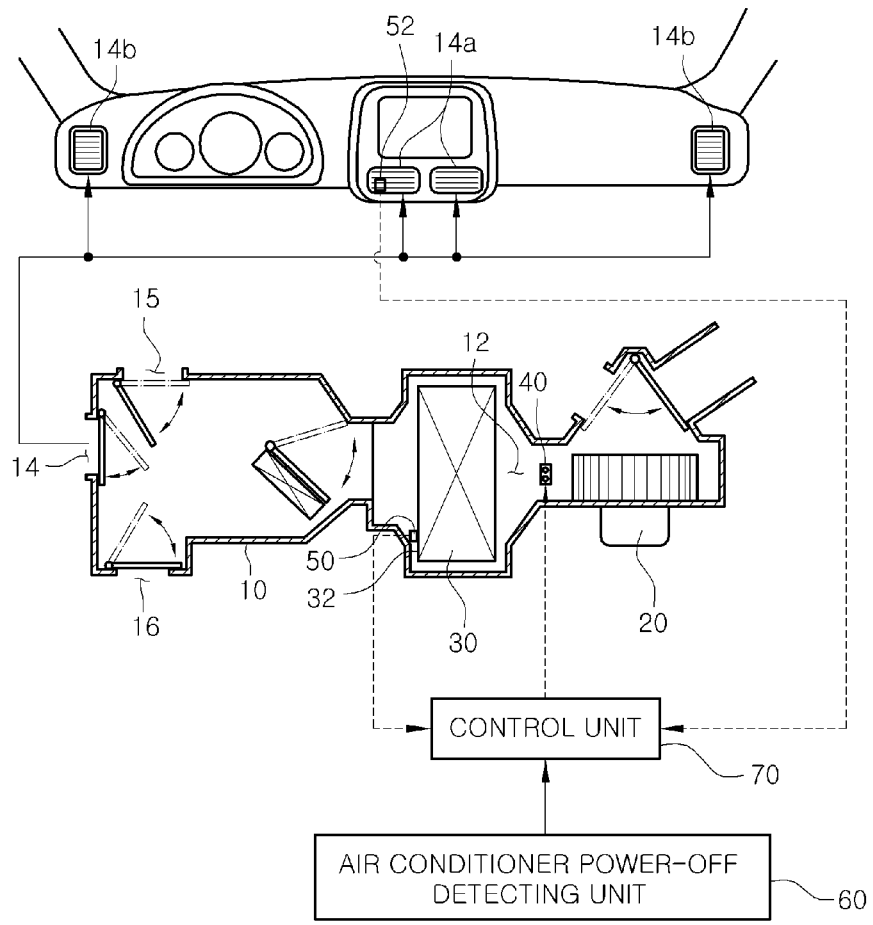
[Fig. 2]
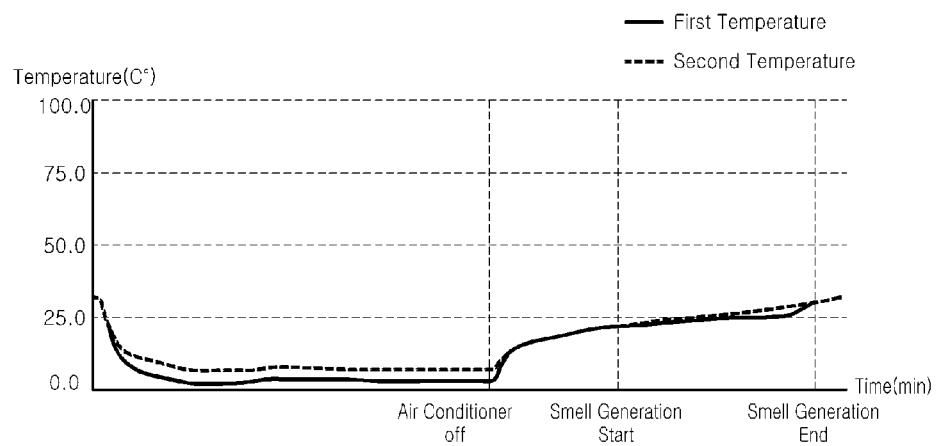

[Fig. 3]
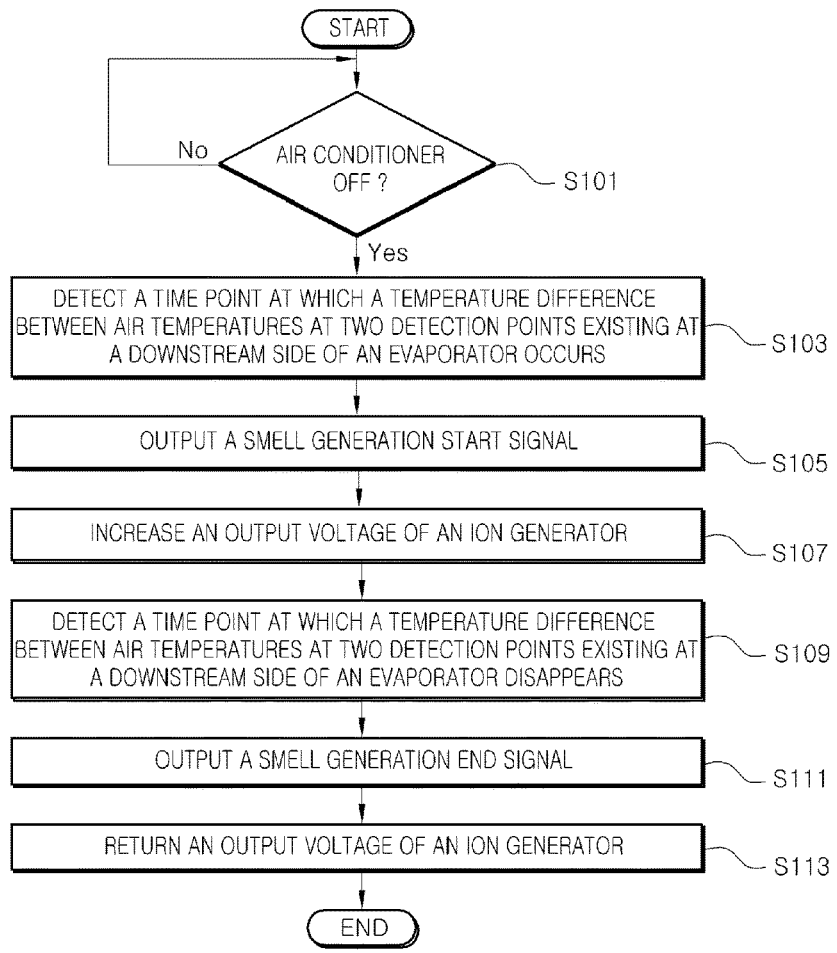
[Fig. 4]
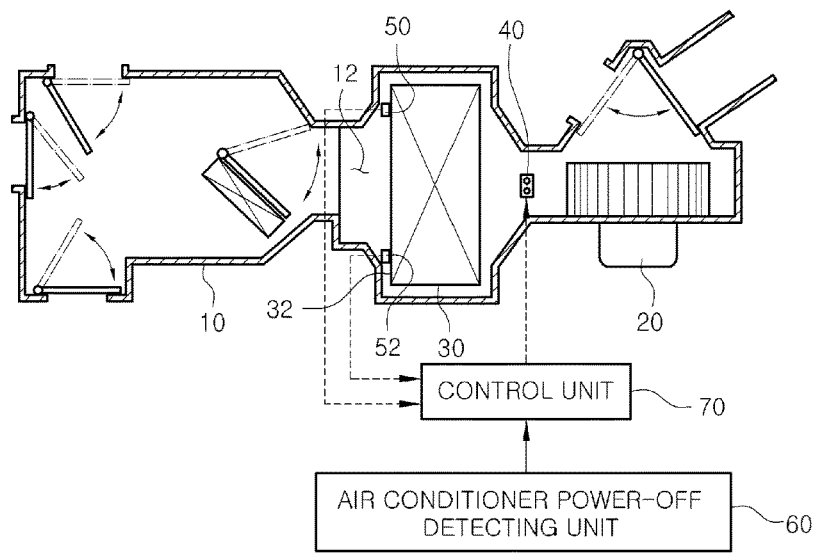

[Fig. 5]
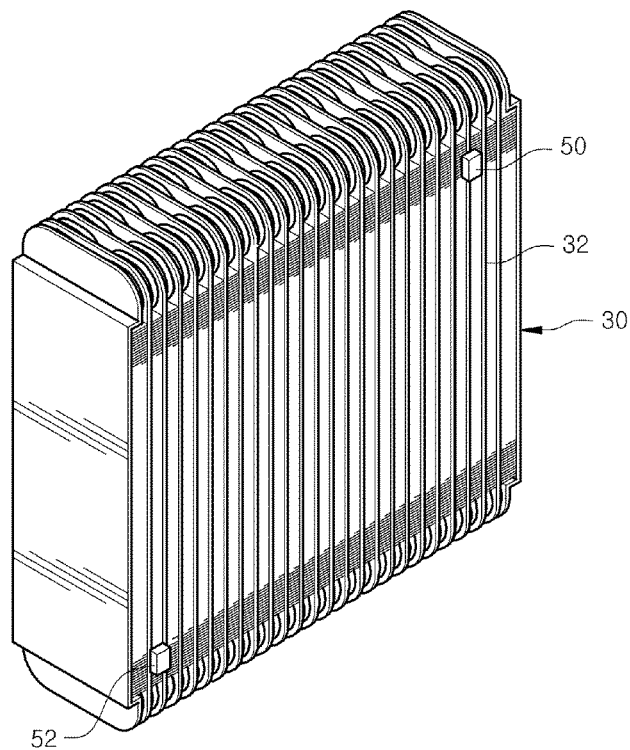
[Fig. 6]
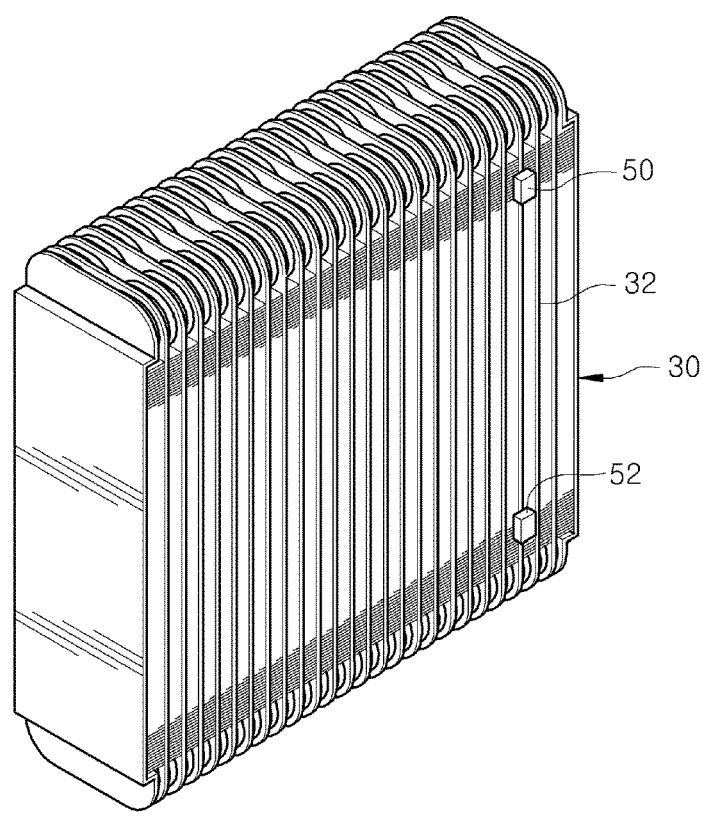

[Fig. 7]
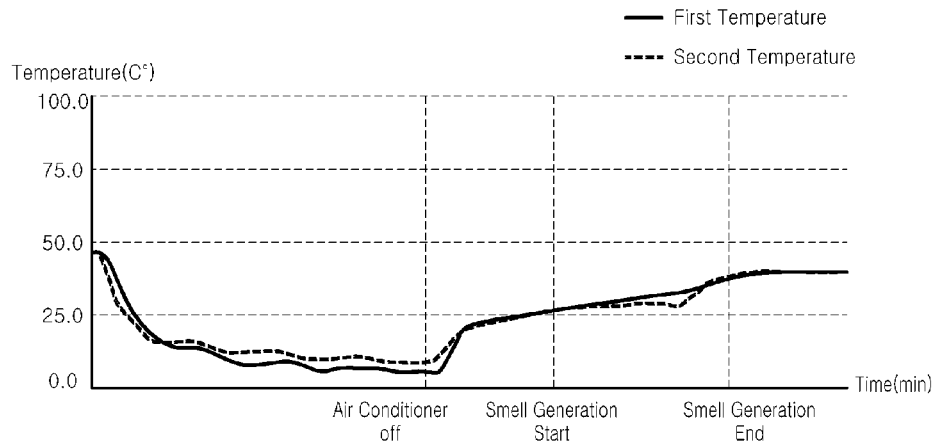
[Fig. 8]
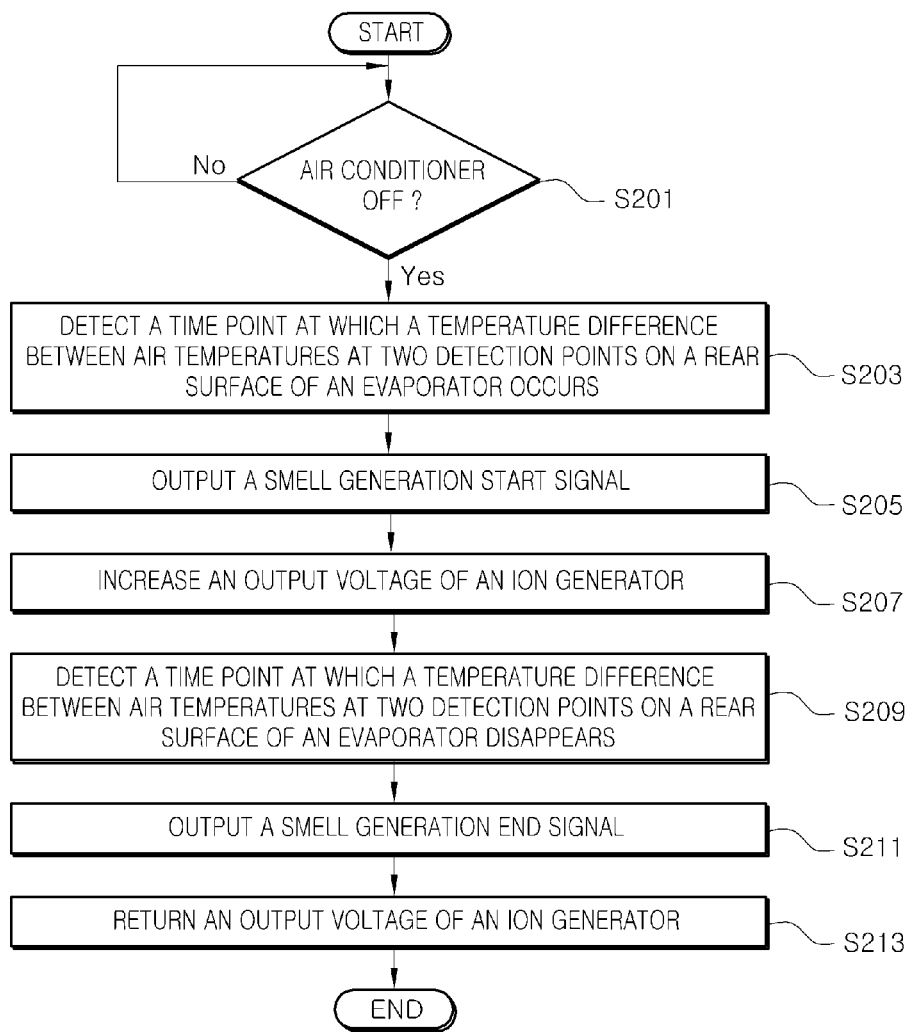

[Fig. 9]
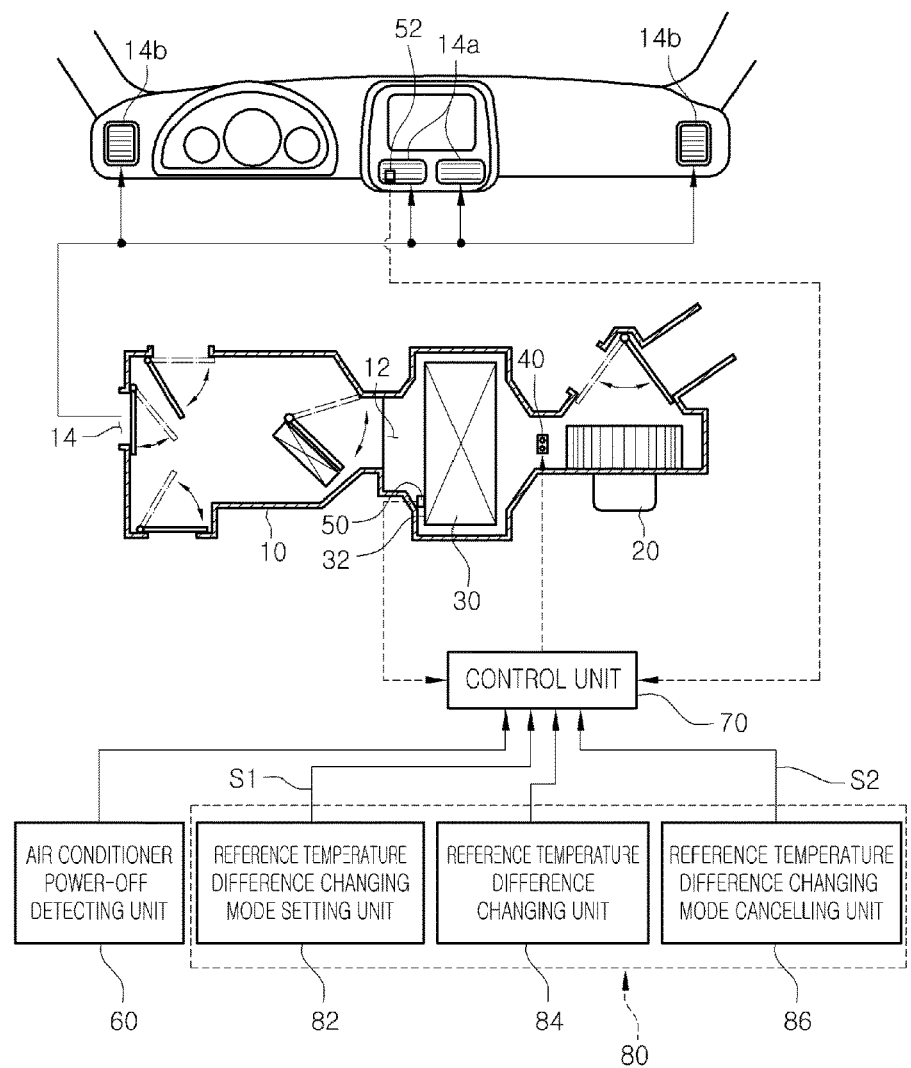
[Fig. 10]
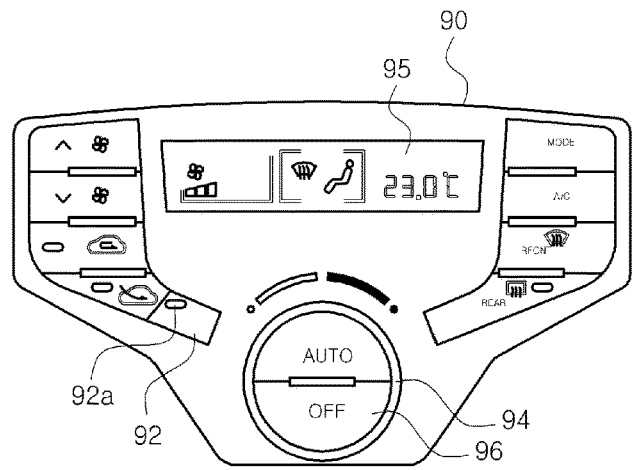

[Fig. 11]
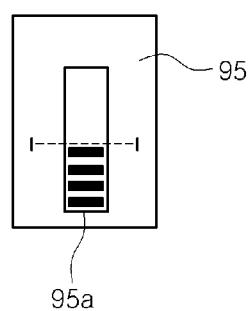
[Fig. 12]
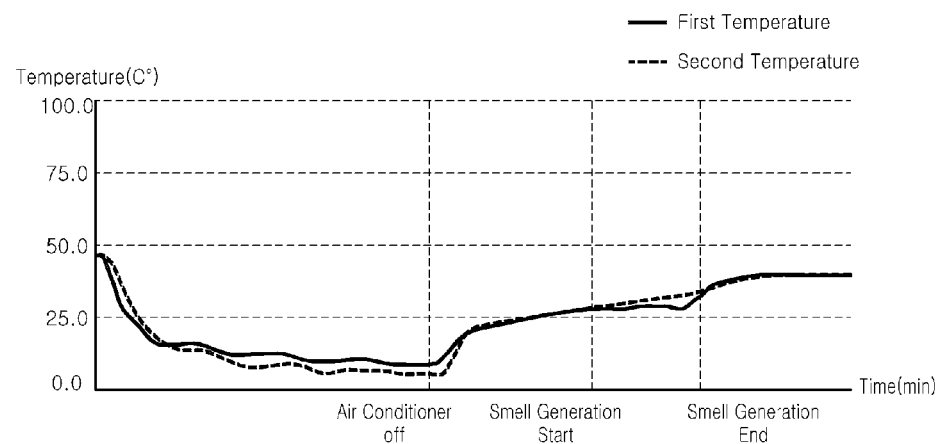

[Fig. 13]
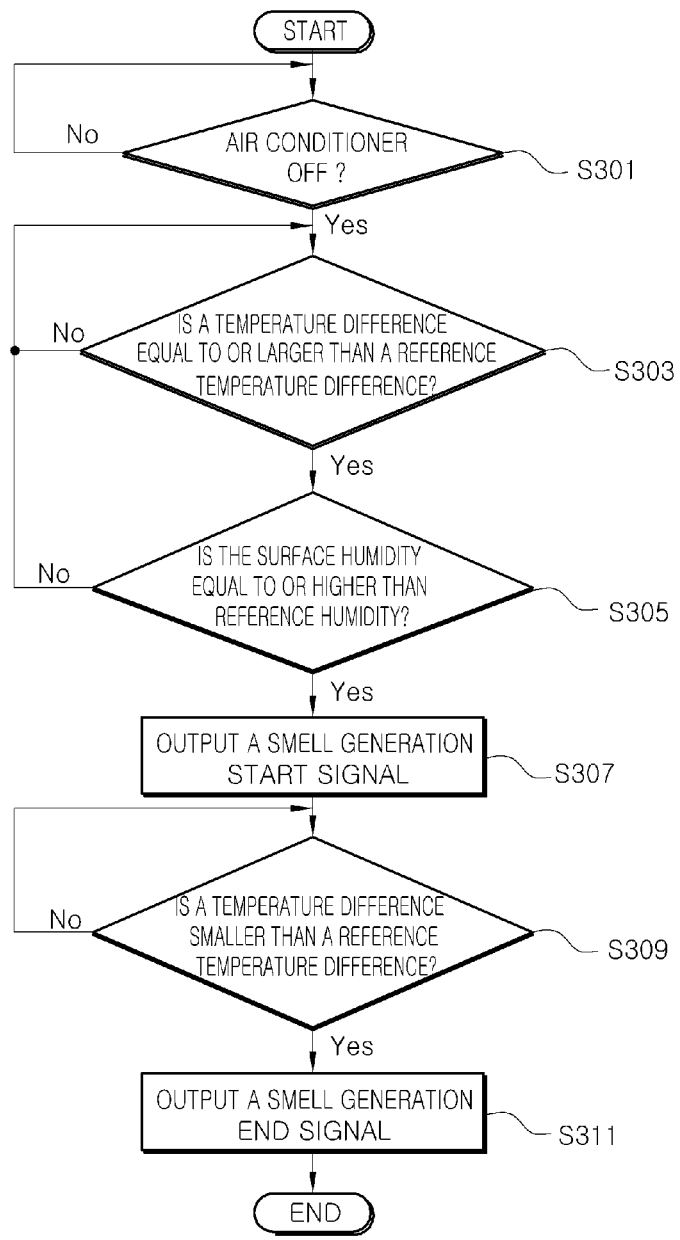

SMELL GENERATION TIME PREDICTING DEVICE AND SMELL GENERATION TIME PREDICTING METHOD USING THE SAME

CROSS-REFERENCE TO RELATED APPLICATIONS

This application is a United States national phase application based on PCT/KR2014/000965 filed Feb. 5, 2014, which claims the benefit of Korean Patent Application Nos. 10-2013-0013349 dated Feb. 6, 2013, 10-2013-0013347 dated Feb. 6, 2013, and 10-2013-0019289 dated Feb. 22, 2013.

TECHNICAL FIELD

The present invention relates to a smell generation time predicting device for a vehicle air conditioner and a smell generation time predicting method using the same. More specifically, the present invention pertains to a smell generation time predicting device capable of accurately predicting the time of generation of a fungus odor or other bad smells in an evaporator and capable of enabling a user to manually adjust the sensitivity of prediction of the smell generation time depending on the user's preference and desire, and a smell generation time predicting method using the same.

BACKGROUND ART

In most motor vehicles, a fungus odor or other bad smells is generated during the use of an air conditioner. This is because bacteria, fungi and the like live on the surface of an evaporator.

In recent years, many different methods for the removal of smells generated from an evaporator have been proposed. As one example, there is available a technology in which bacteria, fungi and the like are sterilized and removed by irradiating anions or cations toward the surface of an evaporator.

In order to effectively remove smells generated from an evaporator, it is important to precisely predict the smell generation time. By doing so, it becomes possible to efficiently sterilize and deodorize the evaporator in conformity with the smell generation time. This makes it possible to suppress, to the utmost limit, generation of a fungus odor or other bad smells in the evaporator.

There is known a method of predicting the smell generation time in an evaporator through the use of a humidity sensor.

This method takes advantage of the principle under which a fungus odor or other bad smells is increased along with the increase in the surface humidity of an evaporator. The surface humidity of the evaporator is detected by a humidity sensor. Determination is made as to whether the detected surface humidity of the evaporator is equal to or higher than a predetermined reference humidity. If the result of determination is affirmative, it is predicted that smells will be increased in the evaporator.

In this conventional technology, the generation of a fungus odor or other bad smells is predicted only based on the humidity data obtained from a partial surface region of the evaporator. Thus, the conventional technology suffers from a drawback in that the prediction accuracy of the smell generation time is not so high.

This drawback leads to a reduction in the evaporator sterilizing and deodorizing efficiency. This makes it difficult to effectively cope with the generation of a fungus odor or other bad smells.

Moreover, the conventional technology employs an expensive humidity sensor in order to detect the surface humidity of the evaporator, which results in an increase in the manufacturing cost.

In addition, the conventional technology of predicting the smell generation time is configured to predict the smell generation time based on a predetermined reference humidity. For that reason, the conventional technology is not suitable for a vehicle occupant who is very sensitive to smells and can sense a fungus odor or other bad smells even below the reference humidity.

Thus, the conventional technology cannot adapt itself to different smell sensing abilities and different smell sensitivities of individual vehicle occupants, consequently making many users feel inconvenient.

DISCLOSURE

Technical Problem

In view of the aforementioned problems inherent in the prior art, it is an object of the present invention to provide a smell generation time predicting device for a vehicle air conditioner capable of accurately predicting the smell generation time in an evaporator, and a smell generation time predicting method using the same.

Another object of the present invention is to provide a smell generation time predicting device for a vehicle air conditioner capable of efficiently sterilizing and deodorizing an evaporator in conformity with the smell generation time and consequently capable of effectively coping with the generation of a fungus odor or other bad smells in the evaporator, and a smell generation time predicting method using the same.

A further object of the present invention is to provide a smell generation time predicting device for a vehicle air conditioner capable of accurately predicting the smell generation time in an evaporator without having to use an expensive humidity sensor, and a smell generation time predicting method using the same.

A still further object of the present invention is to provide a smell generation time predicting device for a vehicle air conditioner capable of saving a manufacturing cost, and a smell generation time predicting method using the same.

A yet still further object of the present invention is to provide a smell generation time predicting device for a vehicle air conditioner capable of enabling a use to manually set a prediction reference of the smell generation time, and a smell generation time predicting method using the same.

An even yet still further object of the present invention is to provide a smell generation time predicting device for a vehicle air conditioner capable of enabling a use to arbitrarily adjust the prediction sensitivity of the smell generation time depending on the user's preference and desire, and a smell generation time predicting method using the same.

An additionally even yet still further object of the present invention is to provide a smell generation time predicting device for a vehicle air conditioner capable of positively coping with different smell sensing abilities and different smell sensitivities of individual vehicle occupants, and a smell generation time predicting method using the same.

Technical Solution

In order to attain the above object, there is provided a smell generation time predicting device for a vehicle air conditioner which includes an evaporator installed in an internal path of an air conditioner case and configured to, when the air conditioner is turned on, cool an air blown into a vehicle room, the device including: a first temperature detector and a second temperature detector installed at a downstream side of the evaporator in a mutually spaced-apart relationship so as to detect air temperatures at two detection points existing at the downstream side of the evaporator; and a control unit configured to, when the air conditioner is turned off, predict a smell generation time in the evaporator depending on a temperature difference between the air temperatures detected by the first temperature detector and the second temperature detector.

Also, there is provided a smell generation time predicting method for a vehicle air conditioner which includes an evaporator installed in an internal path of an air conditioner case and configured to, when the air conditioner is turned on, cool an air blown into a vehicle room, the method including: step a) of detecting air temperatures at two detection points existing at a downstream side of the evaporator (30); step b) of, when the air conditioner is turned off, outputting a smell generation start signal at a time point at which a temperature difference between the air temperatures occurs; and step c) of outputting a smell generation end signal at a time point at which the temperature difference between the air temperatures disappears.

Advantageous Effects

In the smell generation time predicting device for a vehicle air conditioner and the smell generation time predicting method using the same, the smell generation time is predicted by detecting an air temperature difference between two detection points existing at a downstream side of an evaporator. Therefore, as compared with the prior art in which the smell generation time is predicted only based on the humidity data obtained from a partial surface region of the evaporator, it is possible for the present device and method to accurately predict the smell generation time in the evaporator.

Since the smell generation time in the evaporator can be accurately predicted as mentioned above, it is possible to control an output voltage of an ion generator in conformity with the smell generation time. This makes it possible to increase the evaporator sterilizing and deodorizing efficiency.

Inasmuch as the evaporator sterilizing and deodorizing efficiency can be increased as mentioned above, it is possible to effectively cope with the generation of a fungus odor or other bad smells in the evaporator.

In the present device and method, the smell generation time in the evaporator can be accurately predicted through the use of a low-priced temperature sensor. This eliminates the need to use an expensive humidity sensor. It is therefore possible to save the manufacturing cost of the present device.

The present device and method enable a user to manually set the prediction reference of the smell generation time. Thus, the user can arbitrarily adjust the prediction sensitivity of the smell generation time depending on the user's preference and desire.

Since the prediction sensitivity of the smell generation time can be arbitrarily set depending on the user's preference and desire, it is possible to positively cope with different smell sensing abilities and different smell sensitivities of individual vehicle occupants.

DESCRIPTION OF DRAWINGS

FIG. 1 is a view showing a smell generation time predicting device for a vehicle air conditioner according to a first embodiment of the present invention.

FIG. 2 is a graph illustrating the smell generation time which depends on a temperature difference between two detection points existing at a downstream side of an evaporator when an air conditioner is turned off.

FIG. 3 is a flowchart showing a smell generation time predicting method which makes use of the smell generation time predicting device of the first embodiment.

FIG. 4 is a view showing a smell generation time predicting device for a vehicle air conditioner according to a second embodiment of the present invention.

FIG. 5 is a perspective view of an evaporator showing one instance of installation of a first temperature detector and a second temperature detector which constitute the smell generation time predicting device of the second embodiment.

FIG. 6 is a perspective view of the evaporator showing another instance of installation of the first temperature detector and the second temperature detector which constitute the smell generation time predicting device of the second embodiment.

FIG. 7 is a graph illustrating the smell generation time which depends on a temperature difference between two detection points existing on a rear surface of an evaporator when an air conditioner is turned off.

FIG. 8 is a flowchart showing a smell generation time predicting method which makes use of the smell generation time predicting device of the second embodiment.

FIG. 9 is a view showing a smell generation time predicting device for a vehicle air conditioner according to a third embodiment of the present invention.

FIG. 10 is a view showing an air conditioner controller including a reference temperature difference changing mode setting unit and a reference temperature difference changing unit which constitute the smell generation time predicting device of the third embodiment.

FIG. 11 is a view showing one example of an operation of the smell generation time predicting device of the third embodiment, in which the changed state of a reference temperature difference value as a prediction reference of the smell generation time is symbolically displayed on a display unit of a controller.

FIG. 12 is a graph illustrating the smell generation time which depends on a temperature difference between two detection points existing at a downstream side of an evaporator when an air conditioner is turned off, in which a reference temperature difference as a prediction reference of the smell generation time is adjusted.

FIG. 13 is a flowchart showing one example of an operation of the smell generation time predicting device of the third embodiment.

BEST MODE

According to one aspect of the present invention, there is provided a smell generation time predicting device for a vehicle air conditioner which includes an evaporator installed in an internal path of an air conditioner case and configured to, when the air conditioner is turned on, cool an air blown into a vehicle room, the device including: a first temperature detector and a second temperature detector installed at a downstream side of the evaporator in a mutually spaced-apart relationship so as to detect air temperatures at two detection points existing at the downstream side of the evaporator; and a control unit configured to, when the air conditioner is turned off, predict a smell generation time in the evaporator depending on a temperature difference between the air temperatures detected by the first and second temperature detectors.

According to another aspect of the present invention, there is provided a smell generation time predicting method for a vehicle air conditioner which includes an evaporator installed in an internal path of an air conditioner case and configured to, when the air conditioner is turned on, cool an air blown into a vehicle room, the method including: step a) of detecting air temperatures at two detection points existing at a downstream side of the evaporator (30); step b) of, when the air conditioner is turned off, outputting a smell generation start signal at a time point at which a temperature difference between the air temperatures occurs; and step c) of outputting a smell generation end signal at a time point at which the temperature difference between the air temperatures disappears.

MODE FOR INVENTION

Certain preferred embodiments of a smell generation time predicting device for a vehicle air conditioner and a smell generation time predicting method using the same will now be described in detail with reference to the accompanying drawings.

First Embodiment

Prior to describing a smell generation time predicting device according to the present invention, a vehicle air conditioner will be briefly described with reference to FIG. 1.

The vehicle air conditioner includes an air conditioner case 10, a blower 20, an evaporator 30 and an ion generator 40, the latter three of which are installed in an internal path 12 of the air conditioner case 10.

The blower 20 draws an external air or an internal air and then blows the air into the internal path 12 of the air conditioner case 10.

The evaporator 30 is provided with a plurality of tubes (not shown) through which a coolant can flow. The evaporator 30 serves to cool the air passing through the internal path 12. The air thus cooled is introduced into a vehicle room, thereby cooling the interior of the vehicle room.

The ion generator 40 is installed at the upstream side of the evaporator 30 and is configured to directly irradiate high-voltage pulses toward the air existing within the internal path 12, thereby generating anions and cations which can be introduced into the evaporator 30. Thus, the anions and the cations assist in sterilizing bacteria and fungi living on the surface of the evaporator 30 and deodorizing bad smells generated from the surface of the evaporator 30.

The air conditioner case 10 is provided with a plurality of air discharge vents 14, 15 and 16 which include a face vent 14, a defrost vent 15 and a floor vent 16.

In particular, the face vent 14 is connected to central discharge holes 14a arranged in the central region of a dashboard and side discharge holes 14b arranged in the lateral regions of the dashboard. The face vent 14 allows a cold air passing through the evaporator 30 to flow toward the facial region of a vehicle occupant.

Next, a smell generation time predicting device according to the present invention will be described in detail with reference to FIGS. 1 to 3.

Referring first to FIG. 1, the smell generation time predicting device includes a first temperature detector 50 and a second temperature detector 52 sequentially arranged at the downstream side of the evaporator 30.

The first temperature detector 50 is composed of a temperature sensor and is installed at the downstream side of the evaporator 30. More specifically, the first temperature detector 50 is installed on the rear surface 32 of the evaporator 30.

The first temperature detector 50 is configured to detect the temperature of the air passing through the evaporator 30, more specifically, the temperature of the air flowing just after the evaporator 30.

The second temperature detector 52 is composed of a temperature sensor and is installed at the downstream side of the evaporator 30. More specifically, the second temperature detector 52 is installed at the more downstream side than the first temperature detector 50.

The second temperature detector 52 is configured to detect the temperature of the air passing through the evaporator 30. More specifically, the second temperature detector 52 is configured to secondarily detect the temperature of the air whose temperature is firstly detected by the first temperature detector 50.

It is preferred that the second temperature detector 52 is installed farther from the first temperature detector 50 as far as possible. For example, the second temperature detector 52 is preferably installed in the most downstream position of an air flow path existing at the downstream side of the evaporator 30, namely in the air discharge holes 14a, 14b opened toward the vehicle room. It is particularly preferred that the second temperature detector 52 is installed in one of the central discharge holes 14a arranged in the central region of a dashboard.

By arranging the first temperature detector 50 and the second temperature detector 52 farther from each other in the aforementioned manner, it is possible to detect an air temperature change from the time of passage of the air through the evaporator 30 to the time of introduction of the air into the vehicle room when the air conditioner is turned off. This makes it possible to detect a difference between the temperature of the air just after passing through the evaporator 30 and the temperature of the air just prior to being discharged into the vehicle room.

Referring again to FIG. 1, the smell generation time predicting device further includes an air conditioner power-off detecting unit 60 for detecting the power-off of an air conditioner.

The air conditioner power-off detecting unit 60 may be composed of an air conditioner on/off switch (not shown). The air conditioner on/off switch outputs an air conditioner power-off signal when a user turns off the air conditioner using the air conditioner on/off switch, thereby enabling the smell generation time predicting device to detect the power-off of the air conditioner.

In case of an automatically-controlled air conditioner, the air conditioner power-off detecting unit 60 may be composed of an automatic control unit (not shown).

The automatic control unit is designed to automatically turn on or off an air conditioner depending on the temperature of the interior or exterior of a vehicle room. The automatic control unit outputs an air conditioner power-off signal when the air conditioner is turned off, thereby enabling the smell generation time predicting device to detect the power-off of the air conditioner.

Referring again to FIG. 1, the smell generation time predicting device further includes a control unit 70.

The control unit 70 is provided with a microprocessor. If an air conditioner power-off signal is inputted from the air conditioner power-off detecting unit 60, the control unit 70 compares and analyzes the temperature data which are obtained from two detection points existing at the downstream side of the evaporator 30 and inputted from the first temperature detector 50 and the second temperature detector 52.

More specifically, the control unit 70 determines whether a temperature difference is generated between the temperature data obtained from two detection points existing at the downstream side of the evaporator 30.

If a temperature difference begins to occur between the temperature data, the control unit 70 determines that a fungus odor or other bad smells is generated from the time point at which the temperature difference occurs. Upon making such determination, the control unit 70 outputs a smell generation start signal, thereby enabling the smell generation time predicting device to predict the smell generation time in the evaporator 30.

Thereafter, the control unit 70 which has outputted the smell generation start signal continues to compare and analyze the temperature data of two detection points inputted from the first temperature detector 50 and the second temperature detector 52.

If the temperature difference between the temperature data of two detection points is gradually reduced to zero, the control unit 70 determines that the generation of a fungus odor or other bad smells disappears from the time point at which the temperature difference becomes zero. Upon making such determination, the control unit 70 outputs a smell generation end signal. This enables the smell generation time predicting device to predict the end of the smell generation time in the evaporator 30.

The test result shown in FIG. 2 indicates the principle under which the control unit 70 can detect the smell generation time in the evaporator 30 depending on the temperature difference between two detection points existing at the downstream side of the evaporator 30.

According to the test result shown in FIG. 2, the temperature of the evaporator 30 increases after the air conditioner is turned off. As a result, the difference between the air temperature near the evaporator 30 and the air temperature near the air discharge hole opened toward the vehicle room becomes zero. Thus, the temperature difference between two detection points existing at the downstream side of the evaporator 30 disappears.

However, if a predetermined time is lapsed from the power-off time of the air conditioner, condensed water is generated on the surface of the evaporator 30. The condensed water thus generated temporarily hampers heat exchange between the evaporator 30 and the ambient air, consequently preventing a temperature increase in the evaporator 30 for a while.

As a result, a difference is generated between the air temperature near the evaporator 30 and the air temperature near the air discharge hole opened toward the vehicle room. Thus, a temperature difference is generated between two detection points existing at the downstream side of the evaporator 30. At this time, the surface humidity of the evaporator 30 rapidly increases and, therefore, a fungus odor or other bad smells sharply increases in the evaporator 30. As a result, it becomes possible to accurately predict the smell generation starting time point in the evaporator 30.

If a predetermined time is lapsed after the generation of the temperature difference between two detection points existing at the downstream side of the evaporator 30, the condensed water existing on the surface of the evaporator 30 begins to get dried. If the condensed water is completely dried, the difference between the air temperature near the evaporator 30 and the air temperature near the air discharge hole opened toward the vehicle room becomes zero.

Thus, the temperature difference between two detection points existing at the downstream side of the evaporator 30 disappears. At this time, a fungus odor or other bad smells sharply decreases and disappears in the evaporator 30. As a result, it becomes possible to accurately predict the smell generation ending time point in the evaporator 30.

Referring again to FIG. 1, if a temperature difference between the temperature data obtained from two detection points existing at the downstream side of the evaporator 30 begins to occur, the control unit 70 outputs a smell generation start signal and controls the ion generator 40.

That is to say, the control unit 70 makes the output voltage of the ion generator 40 quite higher than the output voltage available before the output of the smell generation start signal. Thus, the amount of anions and cations emitted from the ion generator 40 increases to a great extent. Accordingly, an increased amount of anions and cations can be supplied to the evaporator 30.

As a result, it becomes possible to maximize the effect of sterilizing and deodorizing the evaporator 30. This makes it possible to efficiently remove a fungus odor or other bad smells from the evaporator 30.

If the temperature difference between two detection points existing at the downstream side of the evaporator 30 disappears, the control unit 70 outputs a smell generation end signal and controls the ion generator 40 in a normal mode. This enables the ion generator 40 to operate under a normal operation condition.

Next, description will be made on a smell generation time predicting method using the smell generation time predicting device configured as above.

Referring to FIGS. 1 and 3, it is first determined whether the air conditioner is turned off (S101). If the result of determination is yes, the time point of generation of a temperature difference between two detection points existing at the downstream side of the evaporator 30 is detected (S103).

If the time point of generation of a temperature difference is detected, the control unit 70 determines that a fungus odor or other bad smells is generated from the evaporator 30 and outputs a smell generation start signal (S105). This makes it possible to accurately predict the smell generation starting time point in the evaporator 30.

While outputting the smell generation start signal, the control unit 70 sharply increases the output voltage of the ion generator 40 (S107).

Then, the amount of anions and cations emitted from the ion generator 40 is increased to a great extent. A large amount of anions and cations thus emitted is supplied to the evaporator 30, thereby sterilizing and deodorizing the evaporator 30. As a result, it becomes possible to efficiently remove a fungus odor or other bad smells generated from the evaporator 30.

With the output voltage of the ion generator 40 kept high, the control unit 70 detects the time point at which the temperature difference between two detection points existing at the downstream side of the evaporator 30 disappears (S109).

Upon detecting the time point at which the temperature difference between two detection points existing at the downstream side of the evaporator 30 disappears, the control unit 70 determines that a fungus odor or other bad smells generated from the evaporator 30 is reduced and outputs a smell generation end signal (S111). This makes it possible to accurately predict the smell generation ending time point in the evaporator 30.

While outputting the smell generation end signal, the control unit 70 returns the output voltage of the ion generator 40 to a normal output voltage (S113).

In the smell generation time predicting device and method of the first embodiment described above, the smell generation time is predicted by detecting the air temperature difference between two detection points existing at the downstream side of the evaporator 30. Therefore, as compared with the prior art in which the smell generation time is predicted only based on the humidity data obtained from a partial surface region of the evaporator 30, it is possible for the present device and method to accurately predict the smell generation time in the evaporator 30.

Since the smell generation time in the evaporator 30 can be accurately predicted as mentioned above, it is possible to control the output voltage of the ion generator 40 in conformity with the smell generation time. This makes it possible to increase the evaporator sterilizing and deodorizing efficiency.

Inasmuch as the evaporator sterilizing and deodorizing efficiency can be increased as mentioned above, it is possible to effectively cope with the generation of a fungus odor or other bad smells in the evaporator 30.

In the present device and method, the smell generation time in the evaporator can be accurately predicted through the use of a low-priced temperature sensor. This eliminates the need to use an expensive humidity sensor. It is therefore possible to save the manufacturing cost of the present device.

Second Embodiment

Next, a smell generation time predicting device for a vehicle air conditioner according to a second embodiment of the present invention and a smell generation time predicting method using the same will be described with reference to FIGS. 4 to 8.

Referring to FIGS. 4 and 5, the smell generation time predicting device of the second embodiment includes a first temperature detector 50 and a second temperature detector 52 installed at a downstream side of the evaporator 30. The first temperature detector 50 and the second temperature detector 52 are installed on a rear surface 32 of the evaporator 30.

The first temperature detector 50 is installed in an upper area of the rear surface 32 of the evaporator 30. The first temperature detector 50 is configured to detect the temperature of the upper region of the rear surface 32 of the evaporator 30.

The second temperature detector 52 is installed in a lower region of the rear surface 32 of the evaporator 30. The second temperature detector 52 is configured to detect the temperature of the lower region of the rear surface 32 of the evaporator 30.

It is preferred that the second temperature detector 52 is installed farther from the first temperature detector 50 as far as possible. For example, as shown in FIG. 5, the second temperature detector 52 is preferably installed in a diagonally opposite relationship with the first temperature detector 50 in the lower region of the rear surface 32 of the evaporator 30.

Alternatively, as shown in FIG. 6, the second temperature detector 52 may be installed vertically below the first temperature detector 50 in the lower region of the rear surface 32 of the evaporator 30.

Most preferably, the first temperature detector 50 and the second temperature detector 52 are respectively installed in the region of the rear surface 32 of the evaporator 30 where the temperature increases fastest when an air conditioner is turned off and in the region of the rear surface 32 of the evaporator 30 where the temperature increases slowest when an air conditioner is turned off.

Typically, the region of the rear surface 32 of the evaporator 30 where the temperature increases fastest when an air conditioner is turned off is the upper region of the rear surface 32 of the evaporator 30. The region of the rear surface 32 of the evaporator 30 where the temperature increases slowest when an air conditioner is turned off is the lower region of the rear surface 32 of the evaporator 30.

The reason for installing the first temperature detector 50 and the second temperature detector 52 in this way is to detect, when an air conditioner is turned off, a temperature difference between the region of the rear surface 32 of the evaporator 30 where the temperature increases fastest and the region of the rear surface 32 of the evaporator 30 where the temperature increases slowest.

The reason for detecting the temperature difference between the region of the rear surface 32 of the evaporator 30 where the temperature increases fastest and the region of the rear surface 32 of the evaporator 30 where the temperature increases slowest is to detect the degree of dryness of the evaporator 30 through the temperature difference.

Referring again to FIG. 4, just like the device of the first embodiment, the smell generation time predicting device of the present embodiment further includes an air conditioner power-off detecting unit 60 and a control unit 70.

If an air conditioner power-off signal is inputted from the air conditioner power-off detecting unit 60, the control unit 70 compares and analyzes the temperature data which are obtained from two detection points existing on the rear surface 32 of the evaporator 30 and inputted from the first temperature detector 50 and the second temperature detector 52.

More specifically, the control unit 70 determines whether a temperature difference is generated between the temperature data obtained from two detection points existing on the rear surface 32 of the evaporator 30.

If a temperature difference begins to occur between the temperature data, the control unit 70 determines that a fungus odor or other bad smells is generated from the time point at which the temperature difference occurs. Upon making such determination, the control unit 70 outputs a smell generation start signal, thereby enabling the smell generation time predicting device to predict the smell generation time in the evaporator 30.

Thereafter, the control unit 70 which has outputted the smell generation start signal continues to compare and analyze the temperature data of two detection points inputted from the first temperature detector 50 and the second temperature detector 52.

If the temperature difference between the temperature data of two detection points is gradually reduced to zero, the control unit 70 determines that the generation of a fungus odor or other bad smells disappears from the time point at which the temperature difference becomes zero. Upon making such determination, the control unit 70 outputs a smell generation end signal. This enables the smell generation time predicting device to predict the end of the smell generation time in the evaporator 30.

The test result shown in FIG. 7 indicates the principle under which the control unit 70 can detect the smell generation time in the evaporator 30 depending on the temperature difference between two detection points existing on the rear surface 32 of the evaporator 30.

According to the test result shown in FIG. 7, when an air conditioner is turned on, the amount of a coolant passing through the lower portion of the evaporator 30 is larger than the amount of a coolant passing through the upper portion of the evaporator 30. Thus, a temperature difference is generated between the upper portion and the lower portion of the evaporator 30.

After the air conditioner is turned off, the coolant does not flow through the evaporator 30. Consequently, the temperature difference between the upper portion and the lower portion of the evaporator 30 gradually disappears.

If a predetermined time is lapsed after the air conditioner is turned off, condensed water is generated on the surface of the evaporator 30. The condensed water is first dried from the upper portion of the evaporator 30.

Thus, a temperature difference is generated between the upper portion of the evaporator 30 where the condensed water is first dried and the lower portion of the evaporator 30 where the condensed water is not dried as yet. Consequently, a temperature difference is generated between two detection points existing on the rear surface 32 of the evaporator 30. At this time, the surface humidity of the evaporator 30 rapidly increases and, therefore, a fungus odor or other bad smells sharply increases in the evaporator 30. As a result, it becomes possible to accurately predict the smell generation starting time point in the evaporator 30.

If a predetermined time is lapsed after the generation of the temperature difference between two detection points existing on the rear surface 32 of the evaporator 30, the condensed water existing on the surface of the evaporator 30 is dried. If the condensed water existing in the lower region of the rear surface 32 of the evaporator 30 is completely dried, the temperature difference between two detection points existing on the rear surface 32 of the evaporator 30 becomes zero.

Thus, a fungus odor or other bad smells sharply decreases and disappears in the evaporator 30. As a result, it becomes possible to accurately predict the smell generation ending time point in the evaporator 30.

Referring again to FIG. 4, if a temperature difference between two detection points existing on the rear surface 32 of the evaporator 30 begins to occur, the control unit 70 outputs a smell generation start signal and controls the ion generator 40.

That is to say, the control unit 70 makes the output voltage of the ion generator 40 quite higher than the output voltage available before the output of the smell generation start signal. Thus, the amount of anions and cations emitted from the ion generator 40 increases to a great extent. Accordingly, an increased amount of anions and cations can be supplied to the evaporator 30.

As a result, it becomes possible to maximize the effect of sterilizing and deodorizing the evaporator 30. This makes it possible to efficiently remove a fungus odor or other bad smells from the evaporator 30.

If the temperature difference between two detection points existing on the rear surface 32 of the evaporator 30 disappears, the control unit 70 outputs a smell generation end signal and controls the ion generator 40 in a normal mode. This enables the ion generator 40 to operate under a normal operation condition.

Next, description will be made on a smell generation time predicting method using the smell generation time predicting device configured as above.

Referring to FIGS. 4 and 8, it is first determined whether the air conditioner is turned off (S201). If the result of determination is yes, the time point of generation of a temperature difference between two detection points existing on the rear surface 32 of the evaporator 30 is detected (S203).

If the time point of generation of a temperature difference is detected, the control unit 70 determines that a fungus odor or other bad smells is generated from the evaporator 30 and outputs a smell generation start signal (S205). This makes it possible to accurately predict the smell generation starting time point in the evaporator 30.

While outputting the smell generation start signal, the control unit 70 sharply increases the output voltage of the ion generator 40 (S207).

Then, the amount of anions and cations emitted from the ion generator 40 is increased to a great extent. A large amount of anions and cations thus emitted is supplied to the evaporator 30, thereby sterilizing and deodorizing the evaporator 30. As a result, it becomes possible to efficiently remove a fungus odor or other bad smells generated from the evaporator 30.

With the output voltage of the ion generator 40 kept high, the control unit 70 detects the time point at which the temperature difference between two detection points existing on the rear surface 32 of the evaporator 30 disappears (S209).

Upon detecting the time point at which the temperature difference between two detection points existing on the rear surface 32 of the evaporator 30 disappears, the control unit 70 determines that a fungus odor or other bad smells generated from the evaporator 30 is reduced and outputs a smell generation end signal (S211). This makes it possible to accurately predict the smell generation ending time point in the evaporator 30.

While outputting the smell generation end signal, the control unit 70 returns the output voltage of the ion generator 40 to a normal output voltage (S213).

In the smell generation time predicting device and method of the second embodiment described above, the smell generation time is predicted by detecting the air temperature difference between different detection points existing on the rear surface 32 of the evaporator 30. Therefore, it is possible for the present device and method to accurately predict the smell generation time in the evaporator 30.

Third Embodiment

Next, a smell generation time predicting device for a vehicle air conditioner according to a third embodiment of the present invention and a smell generation time predicting method using the same will be described with reference to FIGS. 9 to 13.

Referring to FIG. 9, just like the first and second embodiments described above, the smell generation time predicting device of the third embodiment includes a first temperature detector 50 and a second temperature detector 52 installed at a downstream side of the evaporator 30.

As in the first embodiment, the first temperature detector 50 and the second temperature detector 52 are respectively installed on the rear surface 32 of the evaporator 30 and in one of the central discharge holes 14a opened toward the vehicle room. The first temperature detector 50 and the second temperature detector 52 detect the air temperatures at two detection points existing at the downstream side of the evaporator 30.

In the present embodiment, the first temperature detector 50 and the second temperature detector 52 are respectively installed on the rear surface 32 of the evaporator 30 and in one of the central discharge holes 14a opened toward the vehicle room. Alternatively, as in the second embodiment, the first temperature detector 50 and the second temperature detector 52 may be installed on the rear surface 32 of the evaporator 30 in a spaced-apart relationship with each other.

As with the first and second embodiments described above, the smell generation time predicting device of the third embodiment further includes an air conditioner power-off detecting unit 60 and a control unit 70.

If an air conditioner power-off signal is inputted from the air conditioner power-off detecting unit 60, the control unit 70 compares and analyzes the temperature data which are obtained from two detection points existing at the downstream side of the evaporator 30 and inputted from the first temperature detector 50 and the second temperature detector 52.

More specifically, the control unit 70 determines whether a temperature difference is generated between the temperature data obtained from two detection points existing at the downstream side of the evaporator 30.

If a temperature difference begins to occur between the temperature data and if the temperature difference thus generated is equal to or larger than a predetermined reference temperature difference, the control unit 70 determines that a fungus odor or other bad smells begins to be generated from the evaporator 30. Upon making such determination, the control unit 70 outputs a smell generation start signal, thereby enabling the smell generation time predicting device to predict the smell generation time in the evaporator 30.

Thereafter, the temperature difference between the temperature data obtained from the two detection points gradually decreases. If the temperature difference between the temperature data obtained from the two detection points becomes smaller than the predetermined reference temperature difference, the control unit 70 determines that the generation of a fungus odor or other bad smells disappears. Upon making such determination, the control unit 70 outputs a smell generation end signal. This enables the smell generation time predicting device to predict the end of the smell generation time in the evaporator 30.

The test results shown in FIGS. 2 and 7 indicate the principle under which the control unit 70 can detect the smell generation time in the evaporator 30 depending on the temperature difference between two detection points existing at the downstream side of the evaporator 30. The principle is the same as that described above in respect of the first embodiment and the second embodiment.

It is preferred that the reference temperature difference stored in the control unit 70 is set equal to 0° C.

This is to make sure that, if the temperature difference between two detection points existing at the downstream side of the evaporator 30 disappears, namely if the temperature difference becomes equal to 0° C., the smell generation time predicting device can immediately predict the start of generation of a fungus odor or other bad smells from the evaporator 30. This helps increase the sensitivity of prediction of the smell generation time.

When outputting the smell generation start signal, the control unit 70 increases the output voltage of the ion generator 40, thereby increasing the emission amount of anions and cations. This makes it possible to efficiently sterilize and deodorize the evaporator 30.

When outputting the smell generation end signal, the control unit 70 controls the ion generator 40 in a normal mode. This enables the ion generator 40 to operate under a normal operation condition.

In addition, the control unit 70 receives information on the surface humidity of the evaporator 30 from a humidity sensor (not shown) installed in the evaporator 30. If the surface humidity of the evaporator 30 is equal to or lower than predetermined reference humidity, e.g., 60% (in terms of relative humidity), even when the temperature difference between two detection points existing at the downstream side of the evaporator 30 is equal to or larger than the reference temperature difference, the control unit 70 determines that a fungus odor or other bad smells is not generated from the evaporator 30. Thus, the control unit 70 does not output a smell generation start signal.

Therefore, if the surface humidity of the evaporator 30 is equal to or lower than 60%, the smell generation time predicting device predicts that a fungus odor or other bad smells is not generated from the evaporator 30.

The reason for employing this configuration is that, if the surface humidity of the evaporator 30 is equal to or lower than 60%, fungi or bacteria do not proliferate in the evaporator 30 and, therefore, a fungus odor or other bad smells is not generated from the evaporator 30.

Referring again to FIG. 9, the smell generation time predicting device of the third embodiment further includes a reference temperature difference changing module 80 configured to change the reference temperature difference stored in the control unit 70.

The reference temperature difference changing module 80 includes a reference temperature difference changing mode setting unit 82. As shown in FIG. 10, the reference temperature difference changing mode setting unit 82 is made up of a button-type reference temperature difference changing mode setting switch 92 installed on the front surface of an air conditioner controller 90.

When pushed by a user, the reference temperature difference changing mode setting switch 92 outputs a reference temperature difference changing mode signal S1, thereby creating a mode in which a reference temperature difference value stored in the control unit 70 and used as a determination criterion of the smell generation time can be changed.

The reference temperature difference changing mode setting switch 92 includes an indicator 92a which is lighted when the reference temperature difference changing mode setting switch 92 is pushed by a user. The indicator 92a thus lighted indicates the mode in which a reference temperature difference value stored in the control unit 70 and used as a determination criterion of the smell generation time can be changed.

Referring again to FIG. 9, the reference temperature difference changing module 80 includes a reference temperature difference changing unit 84.

The reference temperature difference changing unit 84 is configured by, e.g., a temperature adjusting switch 94 which is a rotary switch of the controller 90.

If a user operates the temperature adjusting switch 94 of the reference temperature difference changing unit 84, the reference temperature difference value is controlled depending on the rotational position of the temperature adjusting switch 94.

More specifically, if a user rotates the temperature adjusting switch 94 clockwise, the reference temperature difference value increases. If a user rotates the temperature adjusting switch 94 counterclockwise, the reference temperature difference value decreases. This enables a user to manually adjust the reference temperature difference value as a determination criterion of the smell generation time.

Referring again to FIG. 9, if a reference temperature difference changing mode signal S1 is inputted from the reference temperature difference changing mode setting unit 82, the control unit 70 is switched to a reference temperature difference changing mode.

As shown in FIGS. 10 and 11, the control unit 70 switched to the reference temperature difference changing mode indicates the current reference temperature difference value on a display unit 95 of the controller 90 by virtue of a specific symbol 95a, e.g., a numeral, a level meter or both. It is preferred that the reference temperature difference value is indicated by virtue of a level meter.

By indicating the current reference temperature difference value on the display unit 95, the control unit 70 clearly notifies a user of the current reference temperature difference value.

Furthermore, by indicating the current reference temperature difference value on the display unit 95, the control unit 70 indirectly notifies a user that the air conditioner has been switched to the reference temperature difference changing mode in which the reference temperature difference value as a determination criterion of the smell generation time can be adjusted.

Referring again to FIG. 9, if a user operates the reference temperature difference changing unit 84 in the reference temperature difference changing mode, the control unit 70 changes the reference temperature difference value.

For example, as shown in FIGS. 10 and 11, if a user rotates the temperature adjusting switch 94 of the reference temperature difference changing unit 84 clockwise, the control unit 70 increases the reference temperature difference value. To the contrary, if a user rotates the temperature adjusting switch 94 counterclockwise, the control unit 70 decreases the reference temperature difference value.

In this manner, the reference temperature difference value can be changed by operating the reference temperature difference changing unit 84. This enables a user to readily adjust the reference temperature difference value as a prediction criterion of the smell generation time. As a result, a user can arbitrarily adjust the smell generation starting time point and the smell generation ending time point.

Accordingly, the prediction sensitivity of the smell generation time can be arbitrarily set depending on the user's preference and desire. As a result, it is possible to positively cope with different smell sensing abilities and different smell sensitivities of individual vehicle occupants.

If the reference temperature difference value is changed by the operation of the reference temperature difference changing unit 84, the control unit 70 causes the display unit 95 of the controller 90 to display the changed reference temperature difference value.

As shown in FIG. 11, the display unit 95 displays the changed reference temperature difference value by virtue of a level meter 95a. This enables a user to readily recognize the changed reference temperature difference value.

Referring again to FIG. 9, the smell generation time predicting device of the third embodiment further includes a reference temperature difference changing mode cancelling unit 86.

As shown in FIG. 10, the reference temperature difference changing mode cancelling unit 86 is configured by, e.g., an off-switch 96 which is one of the button switches of the controller 90.

Referring to FIG. 9, the reference temperature difference changing mode cancelling unit 86 is configured to, when pressed by a user, output a reference temperature difference changing mode cancelling signal S2 which in turn is inputted to the control unit 70.

If the reference temperature difference changing mode cancelling signal S2 is inputted to the control unit 70 from the reference temperature difference changing mode cancelling unit 86, the control unit 70 is cancelled from the reference temperature difference changing mode. Then, the control unit 70 stores the reference temperature difference value changed by a user. Thus, the smell generation time predicting device is controlled pursuant to the reference temperature difference value selected by a user.

If the control unit 70 is cancelled from the reference temperature difference changing mode, the control unit 70 removes the display symbol 95a displayed on the display unit 95 of the controller 90 and returns the display unit 95 to an original state.

Moreover, if the control unit 70 is cancelled from the reference temperature difference changing mode, the control unit 70 performs a control operation so as to turn off the indicator 92a of the reference temperature difference changing mode setting switch 92, thereby notifying a user that the smell generation time predicting device has finished the task of changing the reference temperature difference value.

If necessary, the reference temperature difference changing mode cancelling unit 86 may be omitted. In this case, the control unit 70 controls the smell generation time predicting device according to the reference temperature difference value changed by the reference temperature difference changing unit 84. Thereafter, if a predetermined time is lapsed, the control unit 70 allows the changed reference temperature difference value to be automatically stored.

Next, one operation example of the smell generation time predicting device of the third embodiment configured as above will be described with reference to FIGS. 9 and 13.

It is first determined whether the air conditioner is turned off (S301). If the result of determination in step S301 is yes, the control unit 70 determines whether the temperature difference between two detection points existing at the downstream side of the evaporator 30 is equal to or larger than a predetermined reference temperature difference (S303).

If the result of determination in step S303 is yes, the control unit 70 determines whether the surface humidity of the evaporator 30 is equal to or higher than predetermined reference humidity, e.g., 60% (S305).

If the result of determination in step S305 is yes, the control unit 70 determines that a fungus odor or other bad smells is generated from the evaporator 30 and outputs a smell generation start signal (S207). This makes it possible to accurately predict the smell generation starting time point in the evaporator 30. At this time, the control unit 70 increases the output voltage of the ion generator 40, thereby efficiently sterilizing and deodorizing the evaporator 30.

While outputting the smell generation start signal, the control unit 70 determines whether the temperature difference between two detection points existing at the downstream side of the evaporator 30 is smaller than the predetermined reference temperature difference (S309).

If the result of determination in step S309 is yes, the control unit 70 determines that the generation of a fungus odor or other bad smells is reduced and stopped and outputs a smell generation end signal (S311). This makes it possible to accurately predict the smell generation ending time point in the evaporator 30. At this time, the control unit 70 returns the ion generator 40 to the original operation mode.

According to the smell generation time predicting device of the third embodiment configured as above, it is possible to accurately predict the smell generation time in the evaporator 30 and to enable a use to manually adjust the prediction criterion of the smell generation time. Thus, a user can arbitrarily adjust the prediction sensitivity of the smell generation time depending on the user's preference and desire.

Since the prediction sensitivity of the smell generation time can be arbitrarily adjusted depending on the user's preference and desire, it is possible to positively cope with different smell sensing abilities and different smell sensitivities of individual vehicle occupants.

While certain preferred embodiments of the invention have been described hereinabove, the present invention is not limited to these embodiments. It is to be understood that various changes and modifications may be made without departing from the scope of the invention defined in the claims.

INDUSTRIAL APPLICABILITY

The present invention can be applied to an air conditioner for vehicles.

The invention claimed is:

1. A smell generation time predicting device for a vehicle air conditioner which includes an evaporator installed in an internal path of an air conditioner case and configured to, when the air conditioner is turned on, cool air blown into a vehicle room, the device comprising:
   a first temperature detector and a second temperature detector installed on a downstream side of the evaporator in a mutually spaced-apart relationship so as to detect air temperatures at two detection points existing on the downstream side of the evaporator; and
   a control unit configured to, when the air conditioner is turned off, predict a smell generation time in the evaporator based on a temperature difference between the air temperatures detected by the first temperature detector and the second temperature detector.

2. The device of claim 1, wherein, when the air conditioner is turned off, the control unit is configured to output a smell generation start signal at a first time point the temperature difference between the air temperatures detected by the first temperature detector and the second temperature detector occurs and output a smell generation end signal at a second time point at which the temperature difference between the air temperatures detected by the first temperature detector and the second temperature detector disappears.

3. The device of claim 2, wherein the first temperature detector is installed on a rear surface of the evaporator to detect an air temperature of air passing through the evaporator, and the second temperature detector is installed in a central discharge hole arranged at the downstream side of the evaporator and opened toward the vehicle room to detect an air temperature of air discharged from the central discharge hole toward a face of a vehicle occupant.

4. The device of claim 2, wherein the first temperature detector and the second temperature detector are installed on a rear surface of the evaporator in a mutually spaced-apart relationship to detect temperatures at two detection points on the rear surface of the evaporator.

5. The device of claim 4, wherein the first temperature detector is installed in a region of the rear surface of the evaporator dried first when the air conditioner is turned off and the second temperature detector is installed in a region of the rear surface of the evaporator dried last when the air conditioner is turned off.

6. The device of claim 5, wherein the first temperature detector is installed in an upper region of the rear surface of the evaporator and the second temperature detector is installed in a lower region of the rear surface of the evaporator.

7. The device of claim 1, wherein, when the air conditioner is turned off, the control unit is configured to predict generation of a smell from the evaporator and output a smell generation start signal if the temperature difference between the air temperatures detected by the first temperature detector and the second temperature detector is equal to or larger than a predetermined reference temperature difference, and is configured to predict stop of generation of a smell from the evaporator and output a smell generation end signal if the temperature difference between the air temperatures detected by the first temperature detector and the second temperature detector is smaller than the predetermined reference temperature difference.

8. The device of claim 7, wherein, if a surface humidity of the evaporator is equal to or lower than a predetermined reference humidity, the control unit determines that a smell is not generated from the evaporator and does not output the smell generation start signal.

9. The device of claim 7, further comprising:
   a reference temperature difference changing module configured to change the reference temperature difference stored in the control unit and is used as a prediction criterion of the smell generation time.

10. The device of claim 9, wherein the reference temperature difference changing module includes a reference temperature difference changing mode setting unit configured to set a mode in which the reference temperature difference can be changed and a reference temperature difference changing unit configured to change the reference temperature difference, and wherein, if a reference temperature difference changing mode signal is inputted from the reference temperature difference changing mode setting unit to the control unit and if the reference temperature difference is changed by the reference temperature difference changing unit, the control unit predicts the smell generation time based on the changed reference temperature difference.

11. The device of claim 10, wherein, if the reference temperature difference changing mode signal is inputted from the reference temperature difference changing mode setting unit to the control unit, the control unit causes a display unit of an air conditioner controller to display the reference temperature difference by virtue of a specific display symbol.

12. The device of claim 10, wherein the reference temperature difference changing mode setting unit is a reference temperature difference changing mode setting switch installed on a front surface of an air conditioner controller, the reference temperature difference changing mode setting switch including an indicator which is turned on if the reference temperature difference changing mode setting switch is operated to change the reference temperature difference and which is turned off if the reference temperature difference has been changed.

13. The device of claim 10, wherein the reference temperature difference changing unit is configured by a rotary switch installed in an air conditioner controller, wherein the reference temperature difference is adjusted by rotating the rotary switch.

14. The device of claim 10, wherein the reference temperature difference changing module includes a reference temperature difference changing mode cancelling unit, and wherein, if a reference temperature difference changing mode cancelling signal is inputted from the reference temperature difference changing mode cancelling unit to the control unit, the control unit stores a specified reference temperature difference changed by a user and returns the air conditioner to an original operation state.

15. The device of claim 1, further comprising an ion generator arranged to emit anions and cations toward the evaporator, wherein the control unit is configured to, when outputting the smell generation start signal, increase an output voltage of the ion generator so as to increase an emission amount of the anions and the cations and is configured to, when outputting the smell generation end signal, return the output voltage of the ion generator to an original output voltage so as to reduce the emission amount of the anions and the cations.

16. A smell generation time predicting method for a vehicle air conditioner which includes an evaporator installed in an internal path of an air conditioner case and configured to, when the air conditioner is turned on, cool air blown into a vehicle room, the method comprising the steps of:
   detecting air temperatures at two detection points existing on a downstream side of the evaporator;
   when the air conditioner is turned off, outputting a smell generation start signal at a time point at which a temperature difference between the air temperatures occurs; and
   outputting a smell generation end signal at a time point at which the temperature difference between the air temperatures disappears.

17. A smell generation time predicting method for a vehicle air conditioner which includes an evaporator installed in an internal path of an air conditioner case and configured to, when the air conditioner is turned on, cool air blown into a vehicle room, the method comprising the steps of:
   a) detecting air temperatures at two detection points existing at a downstream side of the evaporator;
   b) when the air conditioner is turned off, determining whether a temperature difference between the air temperatures is equal to or larger than a predetermined reference temperature difference and outputting a smell generation start signal if the temperature difference between the air temperatures is equal to or larger than the predetermined reference temperature difference; and
   c) determining whether the temperature difference between the air temperatures is smaller than the predetermined reference temperature difference and outputting a smell generation end signal if the temperature difference between the air temperatures is smaller than the predetermined reference temperature difference.

18. The method of claim 17, wherein, in step a), the air temperatures are respectively detected in a rear surface of the evaporator and in a central discharge hole of a dashboard opened toward the vehicle room.

19. The method of claim 17, wherein, in step a), the air temperatures are respectively detected in a region of a rear surface of the evaporator which is dried first when the air conditioner is turned off and in a region of the rear surface of the evaporator which is dried last when the air conditioner is turned off.

20. The method of claim 17, wherein, in step a), if the surface humidity of the evaporator is equal to or lower than predetermined reference humidity, the smell generation start signal is not outputted even when the temperature difference between the air temperatures is equal to or larger than the predetermined reference temperature difference.

* * * * *